United States Patent
Chen et al.

(10) Patent No.: US 7,688,038 B2
(45) Date of Patent: Mar. 30, 2010

(54) BATTERY CHARGING APPARATUS

(75) Inventors: Hsien-Hung Chen, Tu-Cheng (TW);
Nan-Sheng Chang, Tu-Cheng (TW);
Chia-Han Chan, Tu-Cheng (TW);
Yu-Lee Tseng, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 506 days.

(21) Appl. No.: 11/748,884

(22) Filed: May 15, 2007

(65) Prior Publication Data
US 2008/0284380 A1   Nov. 20, 2008

(51) Int. Cl.
*H02J 7/04* (2006.01)
*H02J 7/16* (2006.01)

(52) U.S. Cl. .................. 320/150; 320/134; 320/116

(58) Field of Classification Search .............. 320/112, 320/116, 134, 137, 138, 150
See application file for complete search history.

(56) References Cited

U.S. PATENT DOCUMENTS

| | | | | |
|---|---|---|---|---|
| 6,307,353 B1* | 10/2001 | Shiojima | ................... | 320/139 |
| 6,509,718 B2* | 1/2003 | Sakai et al. | ................ | 320/134 |
| 6,930,467 B2* | 8/2005 | Suzuki | ..................... | 320/134 |
| 7,570,017 B2* | 8/2009 | Sainomoto et al. | ........ | 320/112 |
| 2003/0044689 A1* | 3/2003 | Miyazaki et al. | ........... | 429/320 |
| 2006/0139007 A1* | 6/2006 | Kim | ........................... | 320/134 |
| 2006/0226810 A1* | 10/2006 | Yang | ......................... | 320/116 |
| 2008/0238370 A1* | 10/2008 | Carrier et al. | .............. | 320/134 |

* cited by examiner

*Primary Examiner*—Patrick J Assouad
*Assistant Examiner*—Alexis Boateng
(74) *Attorney, Agent, or Firm*—Birch, Stewart, Kolasch & Birch, LLP

(57) ABSTRACT

A battery charging apparatus connects secondary batteries of the battery pack, plurality of charge terminals and two discharge terminals to form plurality charge paths and a discharge path, which has a main switch provided on the discharge path, a main controller connecting the battery pack and the main switch, plurality of sub switches provided on the charge paths, plurality of sub controllers connecting secondary batteries of the battery pack and corresponding sub switches, a thermal controller connecting the main controller and a temperature switch. The temperature switch connects the sub switches. The main controller and sub controllers monitor charge state and discharge state of the battery pack to set the main switch and sub switches cut off the discharge path and the charge paths. The thermal controller monitors temperature of the battery pack and main switch to set the main switch and the sub switches cut off the discharge path and the charge paths.

5 Claims, 4 Drawing Sheets

|  | Charging Switch 44 | Discharging Switch 45 |
|---|---|---|
| Over Voltage | OFF | ON |
| Under Voltage | ON | OFF |
| Over Current | OFF | ON |
| Under Current | ON | OFF |
| Short | OFF | OFF |
| Over Temperature | OFF | ON |

FIG. 4

|  | Charging Switch 20 | Discharging Switch 21 |
|---|---|---|
| Over Voltage | OFF | ON |
| Under Voltage | ON | OFF |
| Short | OFF | OFF |
| Over Temperature | OFF | OFF |

FIG. 5

BATTERY CHARGING APPARATUS

BACKGROUND OF THE INVENTION

1. Field of the Invention

The invention relates to a battery charging apparatus, and particularly to a battery charging apparatus for controlling charge and discharge of a secondary battery pack and protecting the secondary battery pack from abnormal voltage operation, abnormal current operation and abnormal temperature operation.

2. The Related Art

In recent electronic apparatus, a battery pack containing a secondary battery or a rechargeable battery, such as a lithium-ion battery is often used as the power supply for supplying power to the electronic apparatus. When the time the lithium-ion battery continuous to be charged is too long, the deposition of lithium metal will occur, which damages the battery pack or the electronic apparatus. On the other hand, when the time the lithium-ion battery continues to be discharged is too long, the repetitive charge/discharge operational life of the battery pack will deteriorate.

Please refer to FIG. 6. A conventional battery charging apparatus 800 for controlling charge and discharge of the battery pack 80 has a monitor circuit 81 and a protection switch 82. The battery pack 80 contains plurality of secondary batteries or rechargeable batteries connected in serial. The battery pack 80 and charge/discharge terminals Vio+, Vio− form a charge/discharge path. The protection switch 82 is provided on the charge/discharge path. The monitor circuit 81 connects the battery pack 80 for monitoring charge/discharge condition of the battery pack 80, such as voltage and current of the battery pack 80.

The monitor circuit 81 connects the protect switch 82 for controlling the protect switch 82 to turn off and turn on. Generally, the battery pack 80 supplies power to the electronic apparatus connected between the charge/discharge terminals Voi+, Voi− and the protection switch 82 turns on to bypass power to an electronic apparatus. Also, an external power source connected between the charge/discharge terminals Voi+, Voi− supplies power to the battery pack 80 through the charge/discharge path and the protection switch 82 turns on to bypass power to the battery pack 80. When the monitor circuit 81 detects over-charge condition or over-discharge condition of the battery pack 80, the monitor circuit 81 sets the protection switch 82 turn off to cuts off the charge/discharge patch.

However, the battery charging apparatus 800 can not monitor charge/discharge state of each secondary battery of the battery pack 80. When the time of one secondary battery of the battery pack 80 continuous to be charged and discharged is too long, the battery pack 80 and the electronic apparatus are damaged.

SUMMARY OF THE INVENTION

An object of the present invention is to provide a battery charging apparatus capable of being supplied power to charge secondary batteries of a battery pack in parallel and protecting the battery pack from over-voltage, under-voltage, over-current, under-current and over-temperature.

According to the invention, the battery charging apparatus has plurality of charge terminals and discharge terminals. The charge terminals, the discharge terminals and the secondary batteries of the battery pack form a discharge path and plurality of charge paths. The battery charging apparatus has a main controller, a main switch, plurality of sub controllers, plurality of sub switches, a temperature switch and a thermal controller.

The main controller connects the secondary batteries of the battery pack and the main switch. The main switch is provided on the discharge path. The sub controllers connect the secondary batteries of the battery pack and the sub switches respectively. The sub switches are provided on the charge paths respectively. The thermal controller connects the main controller and the temperature switch. Two temperature sensors connect the thermal control and attach to the main switch and the battery pack. The temperature switch connects the sub switches.

When the secondary batteries of the battery pack have over-voltage or over-current condition which is detected by the sub controllers, the sub controllers send a control signal to the sub switches to turn off respectively. Therefore the charge paths are cut off to protect the secondary batteries of the battery pack from over-voltage and over-current. When the secondary batteries of the battery pack have under-voltage or under-current condition which is detected by the main controller, the main controller sends a control signal to the main switch to turn off. Therefore the discharge path is cut off to protect the battery pack from under-voltage and under-current.

When the battery pack have over-temperature condition which is detected by the temperature sensor, the thermal controller sends a control signal to the main controller and the temperature switch to set the main switch and the sub switches in OFF state. Therefore, the charge paths are cut off to protect the battery pack from over-temperature. When the battery pack have over-temperature condition which is detected by the temperature sensor, the temperature controller sends a control signal to the main controller to turn off the main switch, Therefore, the discharge path is cut off to protect the main switch from over-temperature.

BRIEF DESCRIPTION OF THE DRAWINGS

The present invention will be apparent to those skilled in the art by reading the following description of a preferred embodiment thereof, with reference to the attached drawings, in which:

FIG. 4 is a table illustrating operation of sub switches corresponding to over-voltage condition, under-voltage condition, over-current condition, under-current condition and over-temperature condition of a battery pack, and short condition of charge paths in charge state according to the present invention;

FIG. 5 is a table showing operation of a main switch corresponding to over-voltage condition, under-voltage condition and over-temperature condition of the battery pack, and short condition of a discharge path in discharge state according to the present invention.

DETAILED DESCRIPTION OF THE PREFERRED EMBODIMENT

Figure 1:
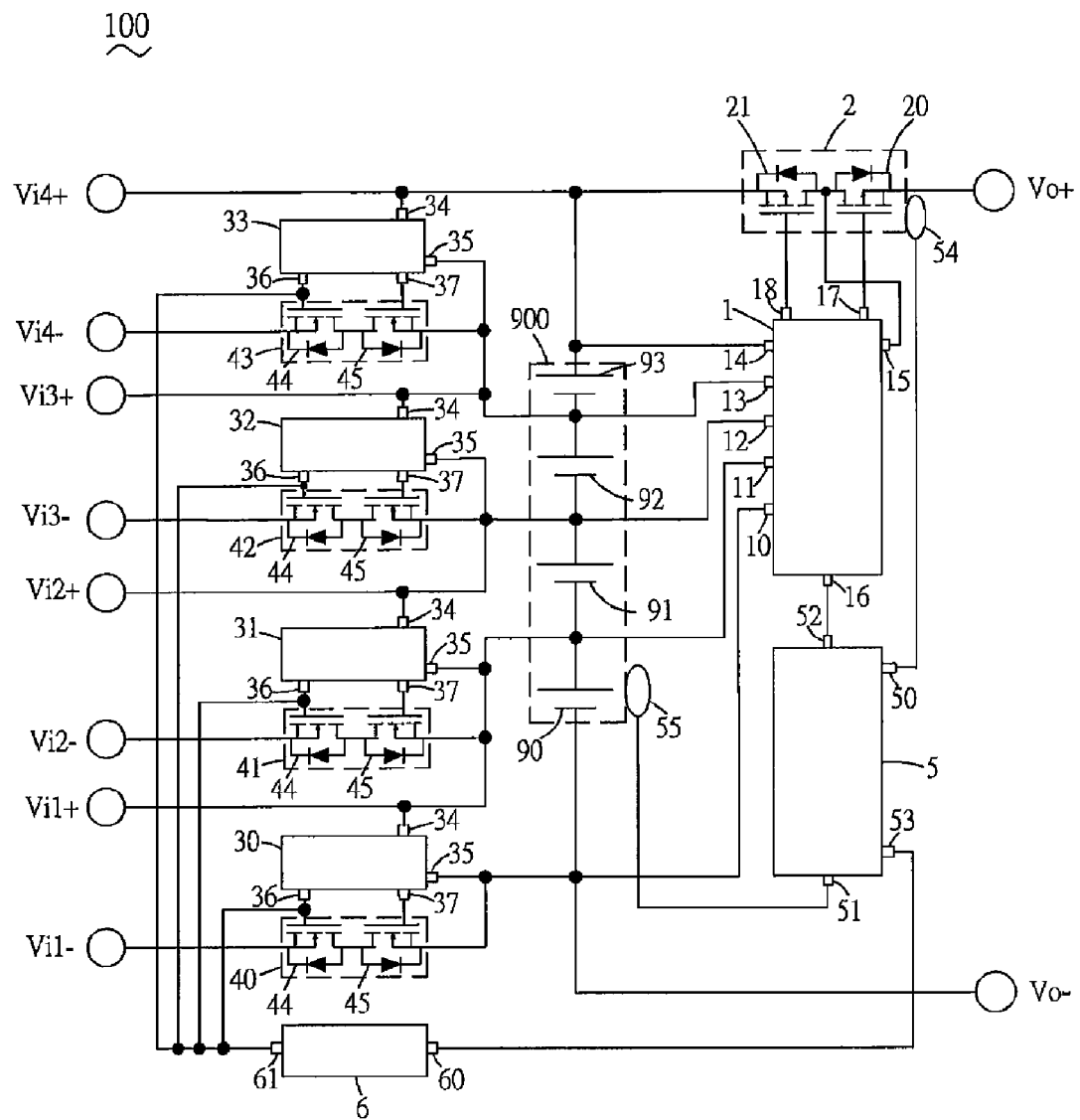
FIG. 1 is a circuit diagram showing a first preferred embodiment of a battery charging apparatus according to the present invention.

Please refer to FIG. 1, which shows a first preferred embodiment of a battery charging apparatus 100 according to the present invention. The battery charging apparatus 100 connects a battery pack 900 to provide the battery pack 900 voltage protection, current protection, temperature protection and short protection. In this case, the battery pack 900 contains secondary batteries 90, 91, 92, 93 connected in serial. The battery pack 900 and discharge terminals Vo+, Vo− form a discharge path. The secondary batteries 90, 91, 92, 93 of the battery pack 900 and charge terminals Vi1+, Vi1−, Vi2+, Vi2−, Vi3+, Vi3−, Vi4+, Vi4− form plurality of charge paths respectively.

The battery charging apparatus 100 has a main controller 1, a main switch 2, plurality of sub controllers 30, 31, 32, 33, plurality of sub switches 40, 41, 42, 43, a thermal controller 5, temperature sensors 54, 55 and a temperature switch 6. The main controller 1 has plurality of input terminals 10, 11, 12, 13, 14, 15, 16 and two output terminals 17, 18.

The input terminal 10 connects cathode of the secondary battery 90. The input terminal 11 connects anode of the secondary battery 90 and cathode of the secondary battery 91. The input terminal 12 connects anode of the secondary battery 91 and cathode of the secondary battery 92. The input terminal 13 connects anode of the secondary battery 92 and cathode of the secondary battery 93. The input terminal 14 connects anode of the secondary battery 93. The input terminal 15 and output terminals 17, 18 connect the main switch 2. The input terminal 16 connects the thermal controller 5.

The main switch 2 connects the discharge path in serial having a charge switch 20 and a discharge switch 21. In this case, the charge switch 20 and the discharge switch 21 both are a p-channel metal oxide semiconductor field effect transistor (MOSFET) connected a diode. Source electrode of the charge switch 21 of the main switch 2 connects cathode of a first diode and the discharge terminal Vo+. Drain electrode of the charge switch 21 of the main switch 2 connects drain electrode of the discharge switch 20 of the main switch 2, anode of the first diode and a second diode, and the input terminal 15 of the main controller 1. Gate electrode of the charge switch 21 of the main switch 2 connects the output terminal 17 of the main controller 1.

Source electrode of the discharge switch 20 of the main switch 2 connects cathode of the second diode and anode of the battery pack 900. Gate electrode of the discharge switch 20 of the main switch 2 connects the output terminal 18 of the main controller 1. The thermal controller 5 has at least two input terminals 50, 51 and at least two output terminals 52, 53. The input terminals 50, 51 connect the temperature sensors 54, 55 respectively. The temperature sensors 54, 55 attach to the main switch 2 and the battery pack 900 respectively. The output terminal 52 of the thermal controller 5 connects the input terminal 16 of the main controller 1. The output terminal 53 of the thermal controller 5 connects the temperature switch 6.

In this case, the temperature sensor 55 attaches to the secondary battery 90 of the battery pack 900 because the secondary battery 90 of the battery pack 900 has highest temperature in charge state and discharge state. The temperature switch 6 has an input terminal 60 and an output terminal 61. The input terminal 60 of the temperature switch 6 connects the output terminal 53 of the thermal controller 5. The output terminal 61 connects the sub switches 40, 41, 42, 43.

Figure 2:
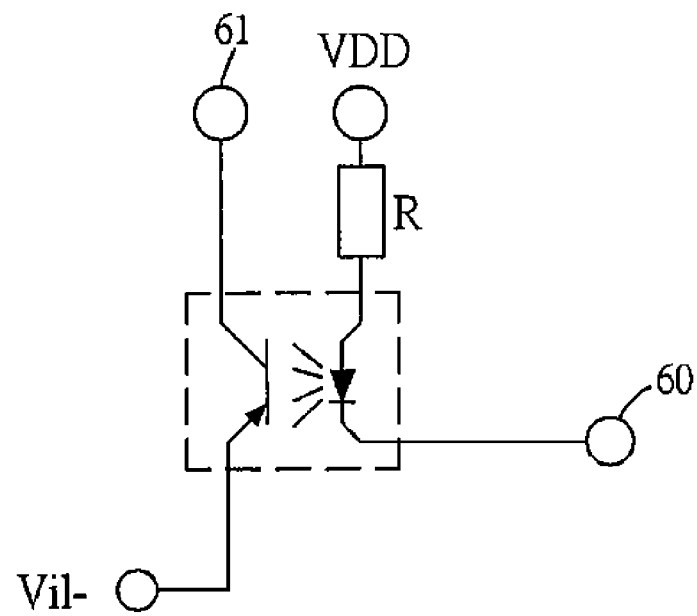
FIG. 2 is a circuit diagram showing a photocoupler connected to the battery charging apparatus according to the present invention.

Please refer to FIG. 2. In this case, the temperature switch 6 is a photocoupler. The photocoupler has a light emitting diode and a phototransistor. Cathode of the light emitting diode connects the output terminal 53 of the thermal control 5. Anode of the light emitting diode connects voltage source VDD of the battery charging apparatus 100. A resistance R connects between the voltage source VDD and anode of the light emitting diode. Collector of the phototransistor connects the sub switches 40, 41, 42, 43. Emitter of the phototransistor connects the charge terminals Vi1−, Vi2−, Vi3−, Vi4−.

Figure 3:
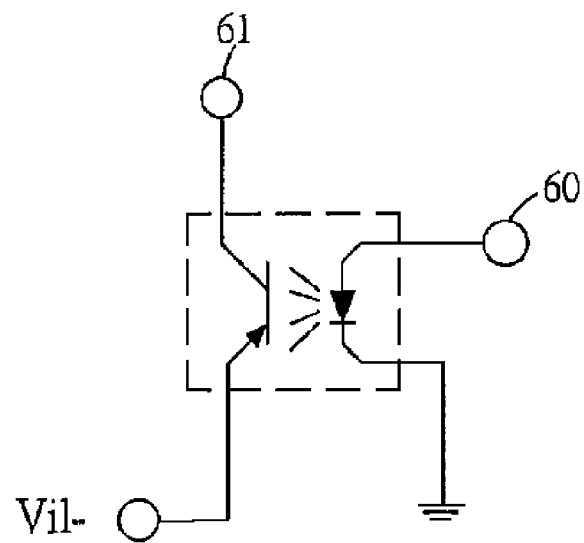
FIG. 3 is a circuit diagram showing a second preferred embodiment of the photocoupler connected to the battery charging apparatus according to the present invention.
Figure 6:
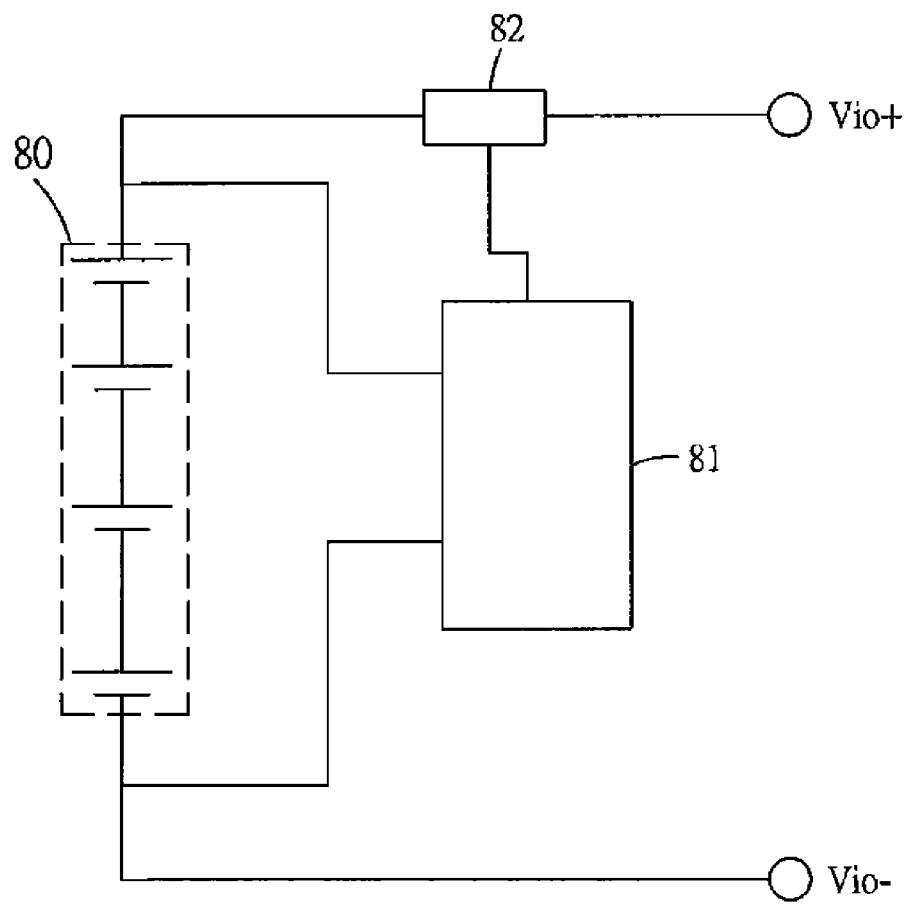
FIG. 6 is a circuit diagram illustrating a conventional battery charging apparatus.

Please refer in FIG. 3, which shows a second preferred embodiment of the battery charging apparatus 100. Cathode of the light emitting diode connects ground of the battery charging apparatus 100. Anode of the light emitting diode connects output terminal 53 of the thermal control 5. Collector of the phototransistor connects the sub switches 40, 41, 42, 43. Emitter of the phototransistor connects the charge terminals Vi1−, Vi2−, Vi3−, Vi4−.

The light emitting diode of the photocoupler sends a light signal to the phototransistor according to the control signal received from the thermal controller. The phototransistor of the photocoupler sends the control signal to the sub switch according to the light signal received from the light emitting diode.

Still referring to FIG. 1. The sub controllers 30, 31, 32, 33 have at least two input terminals 34, 35 and at least two output terminals 36, 37 respectively. The input terminal 34 of the sub controller 30 connects the terminal Vi1+ and anode of the secondary battery 90. The input terminal 35 of the sub controller 30 connects cathode of the secondary battery 90. The input terminal 34 of the sub controller 31 connects the terminal Vi2+ and anode of the secondary battery 91. The input terminal 35 of the sub controller 31 connects cathode of the secondary battery 91. The input terminal 34 of the sub controller 32 connects the terminal Vi3+ and anode of the secondary battery 92. The input terminal 35 of the sub controller 32 connects cathode of the secondary battery 92. The input terminal 34 of the sub controller 33 connects the terminal Vi4+ and anode of the secondary battery 93. The input terminal 35 of the sub controller 33 connects cathode of the secondary battery 93.

The output terminals 36, 37 of the sub controllers 30, 31, 32, 33 electronically connect the sub switches 40, 41, 42, 43 respectively. The sub switches 40, 41, 42, 43 have a charge switch 44 and a discharge switch 45. In this case, the charge switch 44 and the discharge switch 45 both are a n-channel MOSFET connected a diode, Source electrode of the charge switch 44 of the sub switches 40, 41, 42, 43 connects cathode of a third diode and the terminals Vi1−, Vi2−, Vi3−, Vi4− respectively. Drain electrode of the charge switch 44 of the sub switches 40, 41, 42, 43 connects drain electrode of the discharge switch 45 of the sub switches 40, 41, 42, 43 and anode of the third diode and a fourth diode. Gate electrode of the charge switch 44 of the sub switches 40, 41, 42, 43 connects the output terminal 61 of the temperature switch 6 and the output terminal 36 of the sub controllers 30, 31, 32, 33. Source electrode of the discharge switch 45 of the sub switches 40, 41, 42, 43 connects cathode of the fourth diode and cathode of the secondary batteries 90, 91, 92, 93 of the battery pack 900 respectively. Gate electrode of the discharge switch 45 of the sub switches 40, 41, 42, 43 connects the output terminal 37 of the sub controllers 30, 31, 32, 33 respectively.

Please refer to FIG. 4. When the secondary batteries 90, 91, 92, 93 of the battery pack 900 are charged, an external power source (not shown in figures) connects the terminals Vi1−, Vi1+, Vi2−, Vi2+, Vi3−, Vi3+, Vi4−, Vi4+ and supplies power to the secondary batteries 90, 91, 92, 93 in parallel. The sub controllers 30, 31, 32, 33 monitor the charge state of the secondary batteries 90, 91, 92, 93 such as voltage and current of the secondary batteries 90, 91, 92, 93 through the input terminals 34, 35 and then send a control signal to the sub switches 40, 41, 42, 43.

When voltage or current of the secondary batteries 90, 91, 92, 93 is above the threshold voltage or the threshold current and detected by corresponding sub controllers 30, 31, 32, 33, the corresponding sub controllers 30, 31, 32, 33 send a control signal to corresponding sub switches 40, 41, 42, 43. Therefore, the charge switch 44 of corresponding sub switches 40, 41, 42, 43 is turned off and the discharge switch 45 of corresponding sub switches 40, 41, 42, 43 is turned on.

When voltage or current of the secondary batteries 90, 91, 92, 93 is below the threshold voltage or the threshold current and detected by corresponding sub controllers 30, 31, 32, 33, sub controllers 30, 31, 32, 33 send a control signal to corresponding sub switches 40, 41, 42, 43. Therefore, the charge switch 44 of corresponding sub switches 40, 41, 42, 43 is turned on and the discharge switch 45 of corresponding sub switches 40, 41, 42, 43 is turned off.

When the charge paths are short and detected by corresponding sub controllers 30, 31, 32, 33, the sub controllers 30, 31, 32, 33 send a control signal to corresponding sub switches 40, 41, 42, 43. Therefore, the charge switch 44 and the discharge switch 45 of corresponding sub switches 40, 41, 42, 43 are turned off.

Therefore, the charge switches 44 of the sub switches 40, 41, 42, 43 are set off to cut off the charge paths when the sub controllers 30, 31, 32, 33 detect corresponding secondary batteries 90, 91, 92, 93 of the battery pack 90 having over-voltage condition or over-current condition. The discharge switch 45 of the sub switches 40, 41, 42, 43 are set off and the charge switch 44 of the sub switches 40, 41, 42, 43 are set on for making the secondary batteries 90, 91, 92, 93 of the battery pack 90 to be charged when the sub controllers 30, 31, 32, 33 detect corresponding secondary batteries 90, 91, 92, 93 of the battery pack 90 having under-voltage condition or under-current condition. Furthermore, the sub switches 40, 41, 42, 43 are set off to cut off the charge paths when the sub controllers 30, 31, 32, 33 detect corresponding charge paths in short state.

Please refer in FIG. 5. When an external load (not shown in figures) connects between the discharge terminals Vo−, Vo+, the secondary batteries 90, 91, 92, 93 of the battery pack 900 supply power to the external load through the discharge path. The main controller 2 monitors the discharge state of the secondary batteries 90, 91, 92, 93 such as voltage of the secondary batteries 90, 91, 92, 93 through the input terminals 10, 11, 12, 13, 14 and then sends a control signal to the main switch 2.

When voltage of the secondary batteries 90, 91, 92, 93 is above the threshold voltage and detected by the main controller 1, the main controller 1 sends a control signal to the main switch 2. Therefore, the charge switch 20 of the main switch 2 is turned off and the discharge switch 21 of the main switch 2 is turned on. When voltage of the secondary batteries 90, 91, 92, 93 is below the threshold voltage and detected by the main controller 1, the main controller 1 sends a control signal to the main switch 2. Therefore, the charge switch 20 of the main switch 2 is turned on and the discharge switch 21 of the main switch 2 is turned off.

When the discharge path is short and detected by the input terminal 15 of the main controller 1, the main controller 1 sends a control signal to the main switch 2. Therefore, the charge switch 20 and the discharge switch 21 of the main switches 2 are turned off. The discharge switch 21 of the main switch 2 is set off to cut off the discharge path when the sub controllers 30, 31, 32, 33 detect corresponding secondary batteries 90, 91, 92, 93 of the battery pack 90 having under-voltage condition. Furthermore, the charge switch 20 and the discharge switch 21 of the main switches 2 are set off to cut off the discharge path when the main controller 2 detect the discharge path in short state.

When temperature of the main switch 2 is above the threshold temperature and detected by the temperature sensor 54 of the thermal controller 5, the thermal controller 5 sends a control signal to the main controller 1 to set the main switch 2 turn off. Therefore, the charge switch 20 and the discharge switch 21 of the main switch 2 both turn off to cut off the discharge path.

When temperature of the battery pack 90 is above the threshold temperature and detected by the temperature sensor 55 of the thermal controller 5, the thermal controller 5 sends a control signal to the temperature switch 6 to set the sub switches 40, 41, 42, 43 turn off. Therefore, the charge switch 44 of the sub switches 40, 41, 42, 43 are set off and the discharge switch 45 of sub switches 40, 41, 42, 43 are set on to restrain the battery pack 90 from being charged.

Therefore, the external power source supplies power to the secondary batteries 90, 91, 92, 93 of the battery pack 90 through the charge terminals Vi1−, Vi1+, V21−, V21+, V31−, V41+, V41−, V41+ and the charge paths in parallel. The main controller I and the sub controllers 30, 31, 32, 33 monitor discharge state and charge state of the secondary batteries 90, 91, 92, 93 of the battery pack 90 and send control signals to the main switch 2 and the sub switches 40, 41, 42, 43 respectively to make the main switch 2 and the sub switches 40, 41, 42, 43 turn off and turn on for protecting the secondary batteries 90, 91, 92, 93 of the battery pack 90 from over-voltage, over-current, under-voltage and under-current, and protecting the charge paths and the discharge path from short.

Moreover, the thermal controller 5 monitors temperature of the battery pack 90 and temperature of the main switch 2 through the temperature sensors 54, 55 and then sends control signals to the main controller 2 and the temperature switch 6 to make the main switch 2 and the sub switches 40, 41, 42, 43 turn off and turn on for protecting the battery pack 90 and the main switch 2 from over-temperature.

Furthermore, the present invention is not limited to the embodiments described above; various additions, alterations and the like may be made within the scope of the present invention by a person skilled in the art. For example, respective embodiments may be appropriately combined.

What is claimed is:

1. A battery charging apparatus having plurality of charge terminals and two discharge terminals which connect plurality of secondary batteries of a battery pack to form a discharge path and plurality of discharge paths, comprising:

a main switch provided on said discharge path;

a main controller connecting said battery pack and said main switch and providing a control signal to said main switch for setting said main switch in OFF state to cut off said discharge path when an under-voltage condition of said battery pack or a short condition of said discharge path is detected in discharge state;

plurality of sub switches provided on said charge paths;

plurality of sub controllers connecting corresponding secondary batteries of said battery pack and sub switches, said sub controllers providing control signals to corresponding sub switches to be set in OFF state for cutting off corresponding charge paths when an over-voltage condition or an over-current condition of corresponding secondary batteries of said battery pack or a short condition of corresponding charge paths is detected in charge state;

a first and a second temperature sensors attached to said main switch and said battery pack respectively;

a temperature switch connecting said sub switches; and a thermal controller connecting said main controller, said first and second temperature sensors and said temperature switch, said thermal controller providing a control signal to said main controller to set said main switch in OFF state when an over-temperature condition of said main switch is detected by said first temperature sensor in discharge state, said thermal controller providing a control signal to said temperature switch to set said sub switches in OFF state when an over-temperature condition of said battery pack is detected by said second temperature sensor in charge state.

2. The battery charging apparatus as claimed in claim 1, wherein said secondary batteries of said battery pack are connected in serial.

3. The battery charging apparatus as claimed in claim 1, wherein said main switch has a first charge switch and a first discharge switch, said sub switch has a second charge switch and a second discharge switch.

4. The battery charging apparatus as claimed in claim 1, wherein said temperature switch is a photocoupler.

5. The battery charging apparatus as claimed in claim 4, wherein said photocoupler has a LED and a phototransistor, said LED of said photocoupler connects said thermal controller for sending a light signal to said phototransistor according to said control signal received from said thermal controller, said phototransistor connects said sub switches for sending a control signal to said sub switch according to said light signal received from said LED.

* * * * *